United States Patent Office 3,239,452
Patented Mar. 8, 1966

3,239,452
COALESCENCE PROCESS USING POLYOLEFIN
FIBER
Adolph Christiaan van Beest, Amsterdam, and Gerrit Schuur, Delft, Netherlands, assignors to Shell Oil Company, New York, N.Y., a corporation of Delaware
No Drawing. Filed Nov. 20, 1963, Ser. No. 325,131
Claims priority, application Netherlands, Nov. 30, 1962, 286,213
10 Claims. (Cl. 208—187)

This invention relates to the separation of emulsions or suspensions; and, more particularly relates to the coalescence of acid or caustic hazes from hazy hydrocarbon oils. Even more particularly, the invention pertains to a process for coalescing emulsions wherein the emulsion is contacted with a polymer having a particular fiber size.

By coalescence is understood the flowing together of small droplets of liquids so as to form larger droplets. This permits easier and more rapid phase separation.

The problem of the separation of droplets of one liquid from a second liquid which is immiscible with the first is of frequent occurrence in both the petroleum industry and the chemical industry. This happens often in those cases where liquids are contacted with a treating liquid, which is immiscible therewith for the purpose of effecting extractions and/or chemical conversions. Generally, the two liquids are thoroughly mixed, which produces a fine dispersion which may be of the treating liquid in the liquid to be treated. After the contact time required in the particular application, the dispersion is passed into a settler where, owing to differences in gravity, a large part of the dispersed phase separates in the form of a separate layer of liquid often after only a short time. The separation of the relatively fine droplets, however, in many cases proceeds only exceedingly slowly and this separation is sometimes hampered by the presence of surface-active substances which hamper coalescence.

It is known in the art that in the refining of hydrocarbon mixtures with sulfuric acid an improved phase separation may be achieved by first thoroughly mixing the hydrocarbons with sulfuric acid, next passing the hydrocarbon-sulfuric acid emulsion formed through a layer of fibrous polyolefin, and subsequently achieving phase separation in a settler. According to the known method, the layer of polyolefin fibers, which effects coalescence of dispersed liquid, preferably consists of polyethylene fibers which (according to the data on packing density, free space and surface area of the fibers) have a diameter of from 240–700 microns.

In accordance with the instant invention, it has been found that a much more rapid and more efficient coalescence can be effected by applicatioin of polyolefin fibers with an average diameter of from 5–100 microns or even less, e.g., as small as 3 microns. Contrary to expectations, dispersions of extremely small droplets of liquid can easily be caused to coalesce and, consequently, to separate with the use of these very fine fibers, even at relatively high superficial velocities.

The invention, therefore, relates to a process for separating droplets of one liquid from a second liquid which is immiscible with the first by first passing the liquid mixture through a layer of polyolefin fibers and subsequently effecting phase separation. It is important that the liquid mixture be passed through a layer of polyolefin fibers of which the average fiber diameter is from 5–100 microns.

Suitable fibrous materials according to the invention are, in general, fibers of high-molecular weight polyolefins, such as polymers and/or copolymers of $C_2$–$C_5$ olefins. These polyolefins have molecular weights of from 50,000–1,000,000 and preferably of from 100,000–300,000. Of the aforementioned polyolefins, polypropylene is particularly suitable as a fibrous material, because it meets the high mechanical, physical, and chemical demands.

This is because the fibrous material must meet various requirements. Naturally it must not be too brittle and on the other hand it must be sufficiently strong and elastic not to be compressed into an impermeable mass at liquid pressures of normal occurrence. Further, the fiber must not, or substantially not, be soluble in the liquids of the system to be separated, and must likewise not be attacked chemically by these liquids.

A further advantage of polypropylene is that it can be spun to the desired fiber diameter in a simple manner.

The polyolefin fibers according to the invention can be applied both in the form of loose fibers and in a processed form, for instance as felt. Preferably the fiber diameter is from 10–60 microns. The length of the polyolefin fibers is at least 10 times and preferably at least 100 times the fiber diameter.

It is observed that the thickness of the layer of fibers may vary between wide limits. In general with application of loose fibrous material a somewhat larger layer thickness will be required than with use of, for instance, felt, because the latter as a rule will possess a more homogeneous texture. For loose fibrous material the layer thickness in general varies from 5–100 centimeters and preferably from 20–50 centimeters. For processed fibers, such as felt, the layer thickness generally is from 1–30 centimeters and preferably from 2–10 centimeters.

As regards the packing density of the fibrous layer, it is stated that although the present fine fibers permit the application of a relatively high density, the fibrous layer nevertheless preserves a very high percentage of free space. High packing densities are in advantage because they very much contribute to fine droplets being "caught" and thus being made to coalesce.

The free space in the fibrous material in general is from 75–98% and preferably from 88–95%. The large free space in the fibrous material is an advantage, because it permits easy handling of, inter alia, systems with a relatively high concentration of dispersed phase.

The velocities with which the liquids to be coalesced are passed through the fibrous layer, expressed as the superficial velocity are generally from 0.1–10 centimeters per second and preferably from 0.5–6 centimeters per second. What velocity will be chosen in a specific case will depend, among other factors, on the nature of the liquid mixture to be separated. Thus it will be desirable with very small droplet sizes and/or with a low surface tension between the liquids to be separated to apply relatively low superficial velocities.

By "superficial velocity" is intended the velocity of the liquid in cubic centimeters per second divided by the cross-sectional area of the fiber layer applied in square centimeters.

If desired, the coalescence may be effected in two or more steps, for intance by passing the liquid to be separated successively through two or more columns, each of which is provided with a layer of fibrous material. An embodiment of this type may be advantageous in cases where the liquid to be separated contains a high concentration of dispersed phase or where the dispersion consists of droplets varying in size. The large droplets formed by coalescence may then by settling or otherwise be separated before the liquid mixture is passed through a following fiber layer.

It is observed that the filling of, for instance, a cylindrical column with loose fibrous material to form a homogeneous bed requires a certain skill. A homogeneous filling is desirable to prevent the occurrence of a non-uniform flow of the liquids over the cross-sectional area of the column. Further, it is essential that the fibers fit tightly against the wall of the column to prevent the liquid from passing along the wall. Homogeneous packing of the column is quite easy using processed fibrous material, which is preferably applied in the form of thick mats of felt because the required height can be obtained simply by stacking the felt mats which have been cut to match the cross-section of the column. The mats can be cut in such a manner as to ensure a proper seal against the wall of the column. Alternatively, rolls of felt mat can be stacked, suitably coaxially with the column and preferably in such a way that the interstices between the rolls of one layer are covered by the bodies of the rolls of a subsequent layer.

In cases where the liquids to be coalesced contain solid impurities, it is recommended that these be previously filtered off to prevent clogging of the fibrous layer.

The fibrous material will, as a rule, be supported on an appropriate means, such as a perforated plate or a wide-mesh screen. On the top, a similar means may likewise be applied, particularly in the case of covering loose fibrous material, because the desired packing density of this material can thus easily be obtained and maintained.

For a better distribution of the liquid over the fibrous coalescer bed, there may be arranged within the same column and upstream of this bed a layer of other, preferably granular packing material, such as gravel. This may in certain cases already effect some coalescing in the liquid. The layer in question may be supported on a plate or screen covering the fibrous bed (as indicated above) so that it precedes the fibrous bed immediately, or there may be a gap between the bed and the layer, in which case the liquid leaving the layer flows through an empty space of the column before entering the fibrous bed.

It is also possible to obtain and maintain the desired packing density of the fibrous bed by dumping a quantity of fairly heavy loose bodies, such as rocks, lumps of metal, gravel, or the like, right on top of the fibrous material (viz without any intervening screen or plate), especially when loose fibrous material is employed. Besides providing the required compression of the fibrous material, the layer of loose bodies thus formed also serves as a distributing and possibly precoalescing means, as has already been discussed above with reference to a separately supported layer of granular material.

As has been stated hereinbefore, the problem of the separation of droplets of one liquid from a second liquid which is immiscible with the first is of frequent occurrence. For instance, when extracting certain components from a liquid with the aid of a treating liquid, or when systems wherein chemical reactions occur in a heterogeneous liquid medium.

Examples are the treatment of petroleum fractions with caustic solution or with acids. In the treatment with acids, for instance, kerosene is first thoroughly contacted with sulfuric acid. Next, as much acid as possible is separated in a settler by separation of the layers. The droplets of acid that remain behind in the kerosene are now, according to the invention, passed through a layer of polyolefin fibers whereupon the relatively large droplets of acid formed by coalescence are separated by settling. It is an advantage of the present fibers that extremely fine droplets of acid also can be removed by coalescence, as a result of which in a subsequent treatment with caustic, only—or substantially only—the acid components dissolved in the kerosene, such as sulfur dioxide and sulfonic acids, need to be neutralized. This means a considerable saving in caustic in comparison with embodiments where conventional means of coalescence are applied.

It is observed that as a rule it is advantageous first to separate, by settling or otherwise, the relatively large droplets from the liquid mixture to be separated and after that to pass the remaining fine dispersion through the layer of polyolefin fibers.

Other systems which according to the invention can be separated are water-in-oil emulsions, such as occur in the production of crude oil, as well as the very rarefactional emulsions which sometimes are formed upon cooling down of hydrocarbon oil fractions such as kerosenes and gas oils, which contain small quantities of dissolved water. Further oil-in-water emulsions, which for instance occur in the refinery in the form of oily waste water.

EXAMPLE I

As starting material use was made of a kerosene obtained by straight-run distillation, with a boiling range of from 150–250° C. (ASTM) and with a mercaptan sulfur content of 129 parts per million.

This kerosene was in a commercial plant continuously introduced into a propeller mixer and thoroughly mixed with a circulating sulfuric acid phase, in the volume ratio of 1:1. The emulsion thus formed was continuously introduced into a settler where the greater part of the dispersed sulfuric acid phase separated off. Part of this commercial stream of kerosene was continuously introduced into a column, mounted in a vertical position, which was provided with a layer of polypropylene fibers. The height of this layer was 50 centimeters, the diameter 39 centimeters, the fiber diameter was 40 microns and the packing density 110 grams per liter.

Nine experiments were conducted; the experiments 1 to 6 at a superficial velocity of 0.5 centimeter per second and the experiments 7 to 9 at 0.9 centimeter per second. The kerosene introduced contained a fine dispersion of sulfuric acid droplets, of which the concentration according to the acid number varied owing to fluctuations in the commercial plant.

The effluent from the coalescer column was introduced into a settler where easy separation of the acid droplets occurred.

From the results included in Table I it appears that a substantially complete removal of the sulfuric acid has been obtained at a superficial velocity of 0.5 centimeter per second.

Table I

| Experiment No. | Superficial velocity, centimeters per second | Acid number, milligrams $H_2SO_4$ per liter | | |
|---|---|---|---|---|
| | | Inlet | Outlet | Removal |
| 1 | 0.5 | 4,107 | 58 | 98.6 |
| 2 | 0.5 | 1,483 | 31 | 97.9 |
| 3 | 0.5 | 11,209 | 124 | 98.8 |
| 4 | 0.5 | 6,552 | 183 | 97.2 |
| 5 | 0.5 | 7,180 | 89 | 98.8 |
| 6 | 0.5 | 6,316 | 51 | 99.2 |
| 7 | 0.9 | 2,173 | 166 | 92.4 |
| 8 | 0.9 | 5,222 | 499 | 90.4 |
| 9 | 0.9 | 5,500 | 515 | 90.6 |

EXAMPLE II

As starting material use was made of a gasoline with a boiling range of from 38–110° C. (ASTM) and with a mercaptan content of 110 parts per million.

This gasoline was in a commercial plant continuously introduced into a propeller mixer and in the presence of air thoroughly mixed with a circulating caustic phase consisting of 40% KOH, 20% triethylene glycol and 40% water (percent by weight). The emulsion formed in the process was continuously introduced into a settler where the greater part of the dispersed caustic phase separated off. Part of this commercial stream of gasoline was continuously introduced in a column, mounted in a vertical position, which was provided with a layer of polypropylene fibers. The height of this layer was 50 centimeters, the diameter 45 centimeters, the fiber diameter 40 microns and the packing density 110 grams per liter.

Seven experiments were conducted at a superficial velocity of 1.5 centimeters per second. The gasoline introduced contained a fine dispersion of caustic droplets, of which the concentration according to the potassium content varied owing to fluctuations in the commercial plant.

The effluent stream from the coalescer column was introduced into a settler where easy separation of the droplets of caustic occurred.

From the results included in Table II it appears that substantially theoretical removal of the caustic was obtained.

Table II

| Experiment No. | Superficial velocity, centimeters per second | Potassium content in parts per million | | |
|---|---|---|---|---|
| | | Inlet | Outlet | Removal, percent |
| 1 | 1.5 | 8 | <0.05 | [1] 100 |
| 2 | 1.5 | 18 | <0.05 | [1] 100 |
| 3 | 1.5 | 70 | <0.05 | [1] 100 |
| 4 | 1.5 | 18 | <0.05 | [1] 100 |
| 5 | 1.5 | 80 | <0.05 | [1] 100 |
| 6 | 1.5 | 31 | <0.05 | [1] 100 |
| 7 | 1.5 | 130 | <0.05 | [1] 100 |

[1] Ca.

EXAMPLE III

Since the results obtained under favorable conditions all turned out to be almost equally good, so that it is hardly possible to show any differences in results due to differences in the choice of conditions, a number of experiments were carried out under conditions at which optimal results could not be obtained, viz. using a thin layer of coalescing material, a very fine dispersion and at relatively high superficial velocities, in order to show the influence of fiber diameter within the preferred range of 10–60 microns.

The suspension consisted of a haze of 0.5% water in kerosene having an average droplet size of 7 microns; the height of the coalescing layer was 8 millimeters. Coalescence efficiency was measured by means of turbidimeter readings effected before and after treatment. Further particulars of conditions employed and results obtained are set out in Table III.

Table III

| Superficial Velocity, Centimeters/Second | Coalescing efficiency, percent | | | | | | | |
|---|---|---|---|---|---|---|---|---|
| | 94% Free space in layer | | | | 88% Free space in layer | | | |
| | 15 Microns | 22 Microns | 35 Microns | 55 Microns | 15 Microns | 22 Microns | 35 Microns | 55 Microns |
| 5 | 59 | 77 | 49 | 13 | 74 | 87 | 67 | 35 |
| 6 | 54 | 74 | 45 | 11 | 67 | 85 | 62.5 | 30 |
| 7 | 49 | 71 | 42 | 9.5 | 69 | 83 | 58.5 | 26 |
| 8 | 45 | 69 | 38 | 8.5 | 55 | 82 | 55 | 21 |
| 9 | 42 | 67 | 35 | 7.5 | 50 | 81 | 53 | 17 |

From this table it is apparent that at any specific value of the superficial velocity employed, a definite maximum of coalescing efficiency is present at a certain fiber diameter lying within the preferred range.

EXAMPLE IV

In order to show the advantage of employing fibers having a diameter of less than 100 microns rather than coarser fibers, some experiments were carried out on kerosenes having various water contents, which were passed through a layer of 5 micron fibers and also through a layer in which the diameters were 100/200 microns. For both layers, the height to diameter ratio was 8. The results obtained at several superficial velocities are set out in Table IV.

Table IV

| Superficial velocity, Centimeters/second | Suspended water before treatment, parts per million | Coalescing efficiency, percent | |
|---|---|---|---|
| | | 5 microns | 100/200 microns |
| 0.55 | 160 | 98.8 | 57 |
| 1.1 | 305 | 95 | 39 |
| 1.7 | 205 | ([1]) | 16 |

[1] Not measured.

For this table, it is apparent that at conditions under which the fine fibers given excellent results, nothing even remotely resembling these results can be obtained with the coarser fibers; at a temperature velocity which is not even extremely high the efficiency of the coarser fibers already becomes so low that it is hardly worth while to carry out the treatment at all.

We claim as our invention:

1. A process for the coalescence of a hazy hydrocarbon oil comprising water dispersed in kerosene which comprises passing said oil through a layer from about 20 to about 50 centimeters thick of polypropylene fibers having a fiber diameter of from about 3 to about 100 microns, having a fiber length at least about 100 times the fiber diameter, wherein said polypropylene has a molecular weight of from about 100,000 to about 300,000, wherein the free space of the layer is from about 88 to about 95%, and wherein said oil is passed through the layer at a superficial velocity of from about 0.5 to about 6 centimeters per second, and subsequently effecting phase separation.

2. The process of claim 1 wherein the polypropylene fibers are in the form of a layer of loose fibers.

3. The process of claim 1 wherein the polypropylene fibers are in the form of felt.

4. The process of claim 1 wherein the liquid mixture is passed successively through at least two layers of polypropylene fibers and the relatively large drops formed by coalescence are separated by sedimentation before the liquid mixture is passed through a following layer of polypropylene fibers.

5. The process of claim 1 wherein the layer of polypropylene fibers are covered by a layer of gravel.

6. A process for the coalescence of a liquid mixture of sulfuric acid and hydrocarbon oil comprising contacting said liquid mixture with a layer of polyolefin fibers, selected from the group consisting of polymers and copolymers of $C_2$–$C_5$ olefins having a molecular weight of from 50,000–1,000,000 and having an average fiber diameter of from about 3 to about 100 microns, and subsequently effecting phase separation.

7. The process of claim 6 wherein the average fiber diameter is from about 10 to about 60 microns.

9. The process of claim 6 wherein the fibers consist of polypropylene.

8. The process of claim 6 wherein the fiber length is at least about 10 times the fiber diameter.

10. The process of claim 6 wherein the relatively large drops are separated off by sedimentation from the liquid mixture to be separated prior to passing the remaining dispersion through a layer of polyolefin fibers.

References Cited by the Examiner

UNITED STATES PATENTS

| | | | |
|---|---|---|---|
| 2,859,260 | 11/1958 | Stiles | 260—683.62 |
| 3,016,345 | 1/1962 | Price | 208—187 |
| 3,098,108 | 7/1963 | Preiser | 208—299 X |
| 3,152,196 | 10/1964 | Marziani | 260—681.5 |

DELBERT E. GANTZ, *Primary Examiner.*

ALPHONSO D. SULLIVAN, PAUL M. COUGHLAN,
*Examiners.*